(12) United States Patent (10) Patent No.: US 12,560,769 B2
Liu et al. (45) Date of Patent: Feb. 24, 2026

(54) PLUG AND SOCKET OF CONNECTOR

(71) Applicant: AVIC JONHON OPTRONIC TECHNOLOGY CO., LTD., Luoyangshi (CN)

(72) Inventors: Naichang Liu, Luoyangshi (CN); Xiaoming Zhao, Luoyangshi (CN); Ming Chen, Luoyangshi (CN); Jingang Xue, Luoyangshi (CN); Xutao Wang, Luoyangshi (CN); Yunzhao Han, Luoyangshi (CN); Weike Li, Luoyangshi (CN)

(73) Assignee: AVIC JONHON OPTRONIC TECHNOLOGY CO., LTD., Luoyangshi (CN)

( * ) Notice: Subject to any disclaimer, the term of this patent is extended or adjusted under 35 U.S.C. 154(b) by 402 days.

(21) Appl. No.: 18/247,545

(22) PCT Filed: Nov. 19, 2021

(86) PCT No.: PCT/CN2021/131729
§ 371 (c)(1),
(2) Date: Mar. 31, 2023

(87) PCT Pub. No.: WO2022/111389
PCT Pub. Date: Jun. 2, 2022

(65) Prior Publication Data
US 2023/0375790 A1 Nov. 23, 2023

(30) Foreign Application Priority Data

Nov. 27, 2020 (CN) .......................... 202011357830.1
Nov. 27, 2020 (CN) .......................... 202011357849.6

(Continued)

(51) Int. Cl.
*G02B 6/38* (2006.01)
*H01R 13/52* (2006.01)
*H01R 13/631* (2006.01)

(52) U.S. Cl.
CPC .......... *G02B 6/3874* (2013.01); *G02B 6/387* (2013.01); *G02B 6/3893* (2013.01); *H01R 13/5205* (2013.01); *H01R 13/6315* (2013.01)

(58) Field of Classification Search
CPC ..... G02B 6/3874; G02B 6/387; G02B 6/3893
See application file for complete search history.

(56) References Cited

U.S. PATENT DOCUMENTS 6,699,054 B1 3/2004 Critelli
2008/0139030 A1* 6/2008 Milo .................... H01R 13/745
439/277

(Continued)

FOREIGN PATENT DOCUMENTS

CN 201038512 Y 3/2008
CN 105244678 A 1/2016

(Continued)

OTHER PUBLICATIONS

International Search Report and Written Opinion issued in International Application No. PCT/CN2021/131729; mailed Feb. 17, 2022; 14 pages.

*Primary Examiner* — Tina Wong
(74) *Attorney, Agent, or Firm* — HAUPTMAN HAM, LLP

(57) ABSTRACT

A connector plug usable to be connected to the connector socket in a fitting manner. The connector plug includes a housing component and an inner core component in the housing component. The housing component includes an inner housing and an outer housing movably sleeved at an outer side of the inner housing in an axial direction. A socket housing includes a socket locking mechanism, and a plug (Continued)

housing includes a corresponding plug locking mechanism usable to be connected to the socket to implement plug-socket locking, and an inner wall of the socket housing includes at least one socket anti-rotating structure in the axial direction, and a plug inner housing includes a matching plug anti-rotating structure usable to implement anti-rotation of the plug and the socket.

13 Claims, 11 Drawing Sheets

(30)     Foreign Application Priority Data

| Nov. 27, 2020 | (CN) | ......................... | 202011357881.4 |
| Nov. 27, 2020 | (CN) | ......................... | 202022824805.1 |
| Nov. 27, 2020 | (CN) | ......................... | 202022824906.9 |
| Nov. 27, 2020 | (CN) | ......................... | 202022824938.9 |
| Nov. 27, 2020 | (CN) | ......................... | 202022824939.3 |
| Nov. 27, 2020 | (CN) | ......................... | 202022825213.1 |

(56)     References Cited

U.S. PATENT DOCUMENTS

| 2013/0029541 A1* | 1/2013 | Chiarelli | ................ | H01R 13/59 |
| | | | | 439/781 |
| 2016/0085035 A1* | 3/2016 | Völker | ................. | G02B 6/3821 |
| | | | | 385/60 |
| 2019/0369335 A1* | 12/2019 | Hu | ........................ | G02B 6/3879 |

FOREIGN PATENT DOCUMENTS

| CN | 106099516 A | 11/2016 |
| CN | 112485866 A | 3/2021 |
| CN | 112485867 A | 3/2021 |
| CN | 112490752 A | 3/2021 |
| CN | 213878582 U | 8/2021 |
| CN | 213878603 U | 8/2021 |
| CN | 213878612 U | 8/2021 |
| CN | 214201836 U | 9/2021 |
| CN | 214201837 U | 9/2021 |

* cited by examiner

PLUG AND SOCKET OF CONNECTOR

RELATED APPLICATIONS

The present application is a U.S. National Phase of International Application Number PCT/CN2021/131729 filed Nov. 19, 2021, and claims priority to Chinese Application Numbers 202022824805.1, 202022824906.9, 202022824939.3, 202022824938.9, 202022825213.1, 202011357830.1, 202011357849.6 and 202011357881.4, all of which were filed on Nov. 27, 2020.

TECHNICAL FIELD

The present invention belongs to the technical field of connectors, and particularly relates to a plug and socket of connector.

BACKGROUND

Optical fiber communication technologies are developing towards a high transmission rate and high bandwidth direction. Low cost, easy operation, high reliability, and miniaturization are the development trends of optical fiber connectors in the future. Common connector locking manners are generally divided into two types. The first one is thread connection, and a plugging end and an insertion end are connected in a thread locking manner; the second one is bayonet connection, and the plugging end and the insertion end are connected in a manner of a staple fitting a corresponding hole slot; and when a connector with two locking manners of thread and staple is used, a relatively big installation space is required, and therefore, a connector installation space needs to be reserved when a device is designed, which results in relatively big waste of space and cost, and at the same time, the two locking manners cannot implement fast locking and separation of the connector, which requires relatively long installation time of construction personnel when the connector is used.

An existing connector generally uses a glue-pouring manner to fix a cable and an inner core, and in order to implement fixation of the cable and an inner core binding sleeve, generally, the cable is pierced into the binding sleeve first, then the binding sleeve is filled with glue, and the glue is solidified after being placed at a normal temperature or being baked at a high temperature, such that the fixation of the cable and the binding sleeve is implemented and a certain tensile force is provided. Disadvantages of this assembling manner of an inner core component are that glue-pouring difficulty is big and a dedicated fixed tooling is required, solidifying time of the glue is long, and production efficiency is low, and in addition, a sheathing of the cable requires to be pretreated to ensure the tensile force between the cable and the inner core. When a product requires a single ferrule, a single support sheath is used between the binding sleeve and the ferrule, to implement hard contact between the binding sleeve and the ferrule. When a hard contact sheath is adapted to different single-core modules, lateral displacement results in a force of a plug, and therefore, a current ferrule provided manner cannot satisfy that when a socket end is provided with different single-core modules, due to different radial positions of the single-core modules of different manufacturers and unchangeable radial position of the insertion core which is provided in a plug end, the ferrule cannot be inserted into and fit the different single-core modules to implement optical path or circuit conduction, which reduces an applicable range of the plug end.

In addition, a current applied connector assembly cooperates with an additional protective housing to implement a scenario of outdoor application, and although the current applied connector assembly can implement a sealing function, it cannot provide enough tensile resistance force. Because the requirement of outdoor tensile resistance force is higher than that of indoor tensile resistance force, such application makes the assembly in a dangerous state, which brings a risk for signal transmission.

SUMMARY

To solve a problem that a relatively large installation space needs to be reserved on the panel when an existing connector insertion end and a plugging end are plugged together and fast insertion, separation, and anti-rotation cannot be implemented, the present application provides a plug and socket of connector.

A first aspect of the present application provides a connector plug, which is used to be connected to a connector socket in a fitting manner, the plug including a housing component and an inner core component which is provided in the housing component, where the housing component includes an inner housing and an outer housing which is axially sleeved at an outer side of the inner housing, the housing component is provided with a locking mechanism which is used to be connected to the socket to implement plug-socket locking, and the inner housing is provided with a plug anti-rotating structure which is adapted to a socket anti-rotating structure.

Optionally, an inner housing of a push-pull housing component is provided with a groove which locks and fits a floating unit on the socket that is adapted to connect to the groove to implement the plug-socket locking.

Optionally, the floating unit is a locking bead, or a locking column which can be in contact with the socket surface, or a locking sheet which is integrated with a connector housing.

Optionally, a back end of the inner housing is provided with a sealing unit which is used to implement a sealing function between the inner core component and the inner housing.

Optionally, the housing component is a thread housing component which includes an inner housing assembly and an outer housing assembling, where the inner housing assembly is provided in the outer housing assembly, an inner core component is mounted in the inner housing assembly, the outer housing assembly of the thread housing component has an inner thread which is used to be connected to a housing thread of an adapted connector to implement the plug-socket locking, and the inner housing assembly includes a front end inner housing and a tail end sealing structure that are connected to each other.

Optionally, an inner wall of the outer housing assembly is provided with an inverted structure in a circumferential direction, and an outer wall of the inner housing component is provided with an adapted inverted structure which stops and fits the inverted structure in an axial direction.

Optionally, the tail end sealing structure includes a connecting cap connected to the front end inner housing, a back end of the connecting cap is a cavity composed of a plurality of elastic claws distributed circumferentially, and an elastic rubber ring for a cable to pass through is provided in the cavity.

After a connector is inserted into and locked with an adapted connector, a tail end conical surface in the outer housing assembly extrudes the elastic claws, and the elastic claws press the elastic rubber ring to shrink an inner cavity of the elastic rubber ring and extrude the cable to implement sealing protection.

Optionally, a backstop surface which stops and fits the tail end sealing structure in the axial direction is provided in a tail end of the outer housing assembly, to prevent the inner housing assembly from de-intercalating from the tail end of the outer housing assembly.

Optionally, a tensile resistance surface is provided in the inner housing assembly, and axially stops and fits a back end of a support sleeve to implement tensile protection of a ferrule component.

Optionally, a protective spring sleeved at an outer side of the cable is provided at the tail end of the outer housing assembly, thereby improving an anti-bending performance.

Optionally, the inner core component includes a support sleeve for passing and assembling of a cable inner core and a ferrule assembly which is assembled at a front end of the support sleeve and is connected to the cable inner core, where the ferrule assembly includes a support housing movably assembled at the front end of the support sleeve in the axial direction, and a ferrule floatingly provided in a radial direction is movably assembled in the support housing.

Optionally, a movable groove is provided on the support housing in a radial direction, at least one ferrule is fixed on a spacer, and the spacer is movably provided in the movable groove to implement radial floating assembling of the ferrule.

Optionally, the spacer is guided along a length direction of the movable groove to be slidably provided in the movable groove, thereby implementing that the ferrule moves in the length direction of the mavable groove.

Optionally, a length of the spacer is equivalent to a groove length of the mavable groove, and a groove width of the movable groove gradually increases from the middle to two ends to enable the spacer to deflect in the movable groove.

Optionally, the support housing includes a base and a cover plate that are connected to each other, where the base is movably assembled at the front end of the support sleeve in an axial direction, and a back end of the base is provided with a *varus* edge fitting a stop portion which is at an outer side of the front end of the support sleeve. A locking sheet is fixed at the front end of the support sleeve, and an elastic member for maintaining a trend of the locking sheet separating backwards from the base is provided between the locking sheet and the base.

Optionally, the movable groove is provided on the base or the cover plate, and a tail housing of the ferrule abuts and limits an opening at the front end of the support housing in a height direction.

Optionally, at least one inner core anti-rotating structure is provided at the outer side of the support sleeve, thereby implementing radial rotation stopping after the inner core component is assembled.

Optionally, the support sleeve is crimped with a cable by mean of a crimping sleeve.

Optionally, the inner core component includes a tail cable and a cable restraint, and the housing component includes a housing and a connecting cap which is fixed at a tail of the housing in an anti-stretching manner; and a front end is assembled in the housing and a back end of a deformable body which is axially limited by the housing are limited by an inner cavity surface at the back end of the connecting cap, and when the connecting cap moves forward, an axial and radial compressive force can be provided for the deformable body, such that the deformable body shrinks inwards until a joint surface on an inner wall thereof is closely fit with a cable restraint to implement tensile resistance.

Optionally, a back end surface of the deformable body is limited by the inner cavity surface of the connecting cap, a back end of a jaw which is assembled between the deformable body and the connecting cap and has axial limitation with the deformable body is limited by the inner cavity surface at the tail of the connecting cap, and the back end of the jaw can cooperate with a surface which gradually converges from front to back in the inner cavity of the connecting cap to compress the deformable body forward and inwards when the connecting cap moves forward.

Optionally, the deformable body implements axial and radial extrusion by means of cooperation of a periphery at the back end of the deformable body with the surface which gradually converges from front to back in the inner cavity at the back end of the connecting cap.

Optionally, the joint surface on the inner wall of the deformable body includes a surface fitting with a peripheral surface of the cable restraint under external pressure and a step surface fitting and limiting a back end surface of the cable restraint.

Optionally, the inner wall of the deformable body is a smooth surface or is provided with a surface having concave-convex lines for reinforcing friction.

Optionally, a tail of the cable restraint is fixed or integrated with a fixed hub having concave-convex lines on a periphery, and the joint surface on the inner wall of the deformable body is fit with the fixed hub under the action of extrusion pressure.

Optionally, the deformable body has a slit which is convenient for pulling apart the deformable body to assemble in a radial direction.

Optionally, the inner core component includes a front end plug-in portion and a back end cable, and the front end plug-in portion has axial floating with a support sleeve which is fixedly provided on the cable; a tail of the housing component has a nut for the cable to pass through a cavity and has a rubber ring which is used to implement cable sealing, and limits a back end of the support sleeve, and a front end of the rubber ring axially limits a housing; and a back end of the rubber ring is limited by the cavity at the back end of the housing, and an inner wall of the cavity of the housing extrudes the rubber ring forward and inwards when the housing moves forward to enable the rubber ring to hold the cable tightly to implement sealing and tensile resistance.

Optionally, the support sleeve is connected to the cable by means of the fixed hub, and the rubber ring is sleeved on the fixed hub and the cable.

Optionally, a connecting sleeve for adapting a gap of the support sleeve and the rubber ring is provided between the support sleeve and the rubber ring.

Optionally, axial floating is implemented by recovering an elastic member between the front end plug-in portion and the support sleeve.

The second aspect of the present application provides a connector socket which is adapted to connect to the above plug, the socket including a socket housing, where at least one socket anti-rotating structure is provided on an inner wall of the socket housing in an axial direction and is used to be adapted to connect to a plug anti-rotating structure provided on a plug housing, and the socket housing further includes a socket locking mechanism used to be connected to a locking mechanism of a housing component of the plug, to implement plug-socket locking.

Optionally, the socket locking mechanism is a floating unit, and the housing component is a push-pull housing component, and an inner housing of the push-pull housing component is provided with a groove which locks and fits the floating unit on the socket that is adapted to connect to the groove to implement the plug-socket locking; or the housing component is a thread housing component which comprises an inner housing assembly and an outer housing assembling, wherein the inner housing assembly is provided in the outer housing assembly, an inner core component is mounted in the inner housing assembly, and the outer housing assembly of the thread housing component has an inner thread which is used to be connected to a housing thread of an adapted connector to implement the plug-socket locking.

Optionally, the socket anti-rotating structure is a groove or a convex key, the plug anti-rotating structure is a corresponding convex key or a corresponding groove, and the groove and the convex key are slided in an axial direction and fit together in an insertion process to implement radial rotation stopping of the plug and the socket.

Optionally, an inner wall surface of the socket housing is provided with a first sealing member which seals and fits an outer wall of the plug housing.

Optionally, the tail end of the socket housing is provided with a second sealing member for implementing sealing between an insertion end and a panel or between an insertion end and a case.

Optionally, the interior of the socket housing is empty, and a convex flat is symmetrically provided at a tail end in the socket housing.

Optionally, when two socket anti-rotating structures distributed oppositely are provided at the front end of the socket housing, where an angle between a symmetry plane of a pair of socket anti-rotating structures and a symmetry plane of a pair of convex flats is 90°.

Optionally, a mounting flange of the socket housing is uniformly provided with at least two screw holes.

By means of the above technical solutions, a connector assembly of the present invention and an existing technology have at least the following beneficial effects:

1. A ferrule is fixed between a base and a cover plate by means of a spacer at a plug end, and the ferrule implements lateral displacement by moving or swinging in a movable groove, such that when a socket end is assembled with single-core modules of different manufacturers and different types, radial positions exist deviation due to different single-core module interfaces. The ferrule in the present invention may be adapted to and inserted into different single-core modules at different positions by means of the lateral radial displacement, which improves versatility of a connector.

2. A connection between an inner core component and a cable is implemented by crimping a crimping sleeve, and there is no waiting time after crimping, and production efficiency is high; and a crimping structure operation is simple, there is no need for a dedicated fixed tooling and to process the cable, and the crimping may be performed after common cutting.

3. Fast guided assembly of the inner core component is implemented, the production efficiency is improved, and a radial anti-rotating function between the inner core component and the connector housing after the inner core component is assembled in place is further implemented.

4. A plug-socket anti-rotating structure is provided on the connector and an adapted connector, which implements radial rotation stopping after being inserted.

5. A sealing structure is provided on a housing component of the connector, which implements sealing of the cable and the inner core component and sealing between the inner core component and the housing component.

6. Radial extrusion of a deformable body is implemented by axial movement of a connecting cap, thereby implementing reliable sealing and holding of the deformable body to the cable at the tail of the inner core component, and when the cable is stretched by an external force, the external force is moved to an outer protective housing due to the holding of the deformable body, thereby implementing sealing and tensile resistance demands of the connector.

7. A spring in a front connector of a connector inner core assembly may be relatively floated with respect to a support sleeve, the support sleeve is fixed with the cable by means of a fixed hub, an end surface at a back side of the support sleeve is in contact with an end surface of a connecting sleeve, and an end surface at another side of the connecting sleeve is in contact with an end surface of a rubber ring in an outer housing component, which not only can adapt axial floating tolerance of a module and tolerance accumulation in the connector, but also can implement that an tensile force is transmitted to the outer housing component by means of an outer housing, and redundant tensile force is not produced to the connector and the module.

The above description is only an overview of the technical solution of the present invention. To understand more clearly the technical means of the present invention, to implement in accordance with the contents of the specification, and to make the above and other purposes, features and advantages of the present invention more obvious and understandable, better embodiments are particularly described below, and with reference to the accompanying drawings, the detailed description is as follows.

7                                                                                                8

Figure 14:
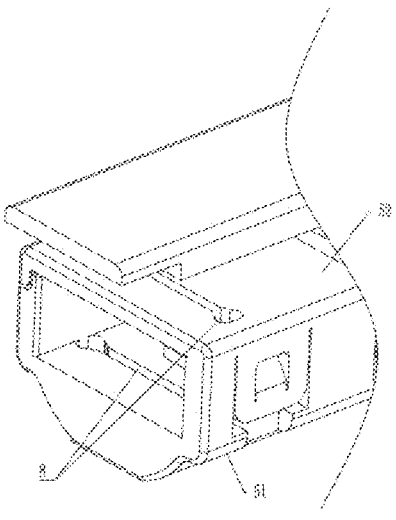
Figure 15:
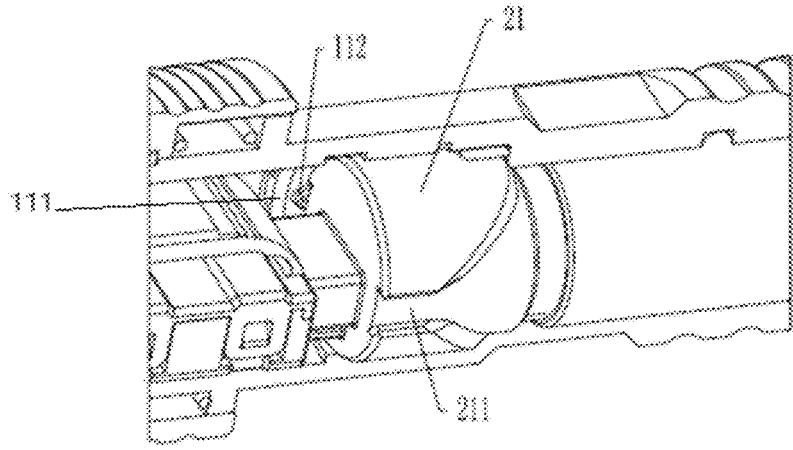
Figure 16:
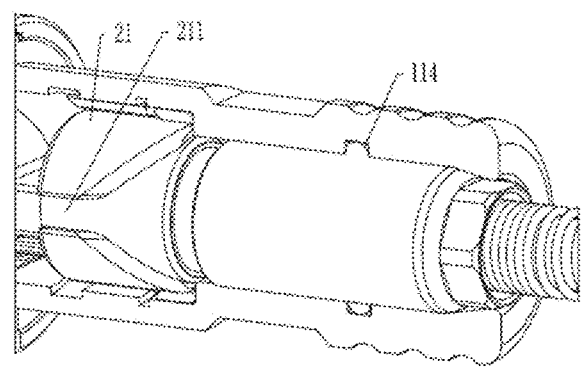
Figure 17:
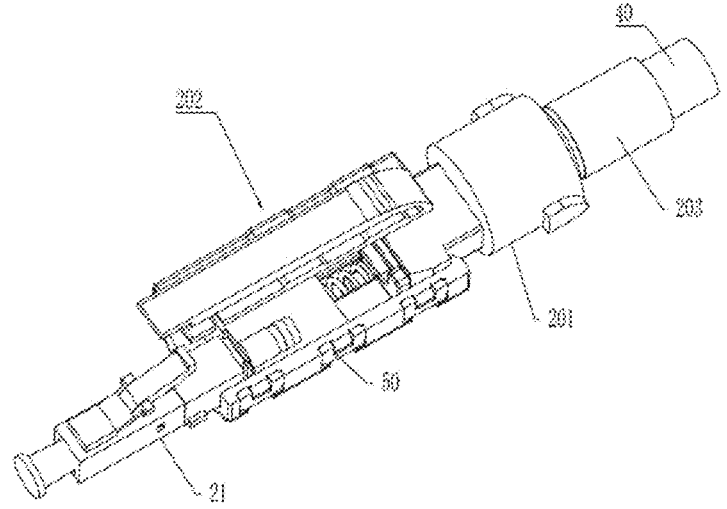
Figure 18:
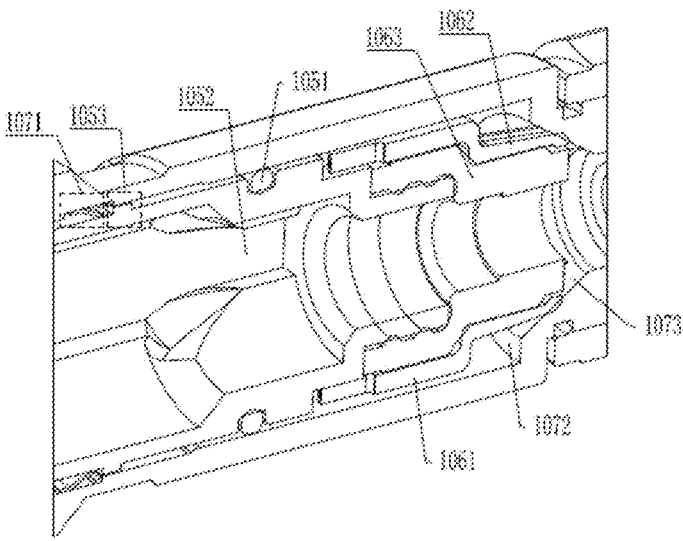
Figure 19:
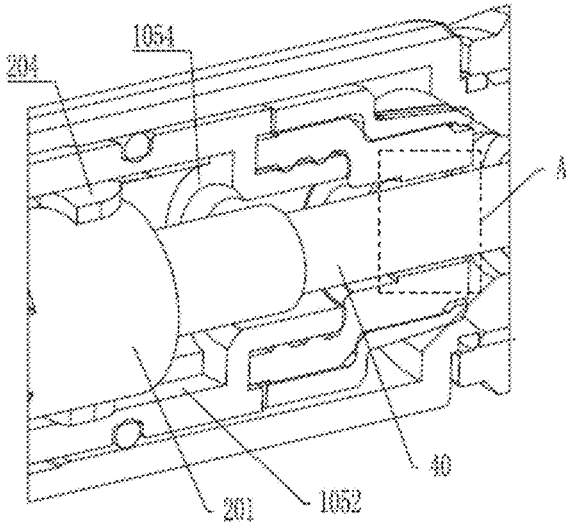
Figure 20:
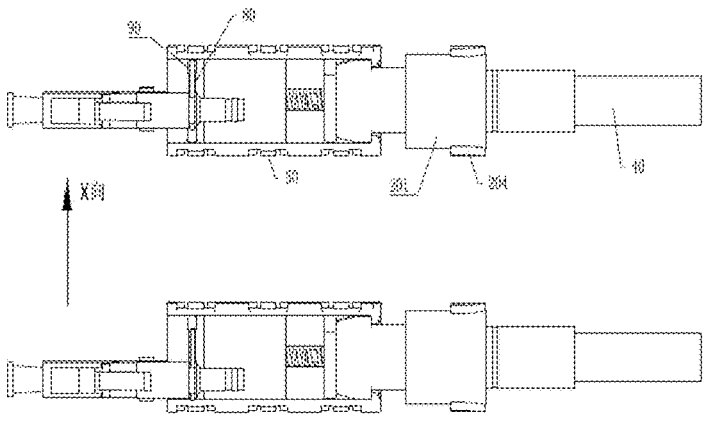
Figure 21:
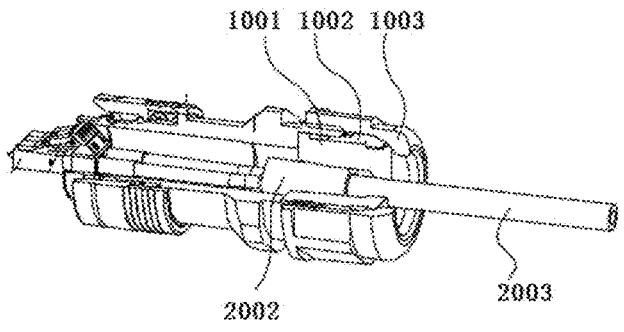
Figure 22A:
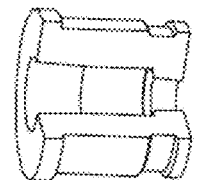
Figure 22B:
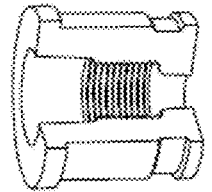
Figure 23:
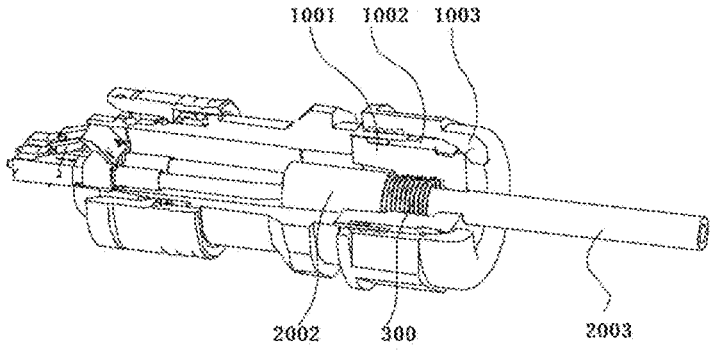
Figure 24A:
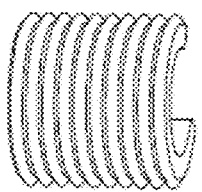
Figure 24B:
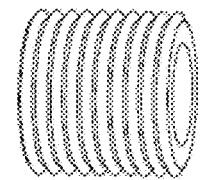
Figure 25:
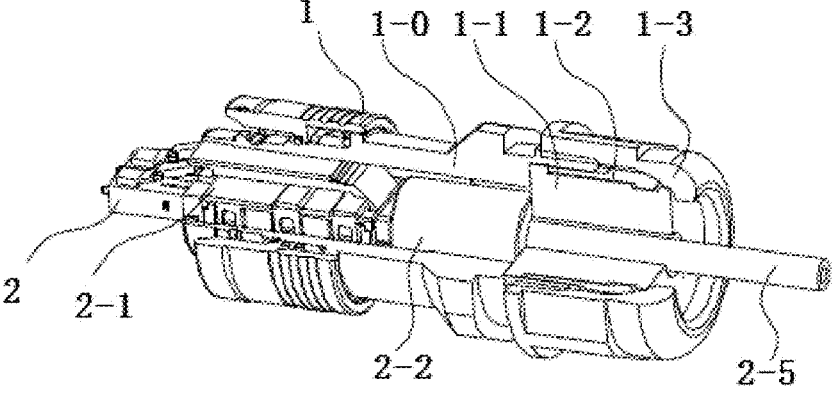
Figure 26:
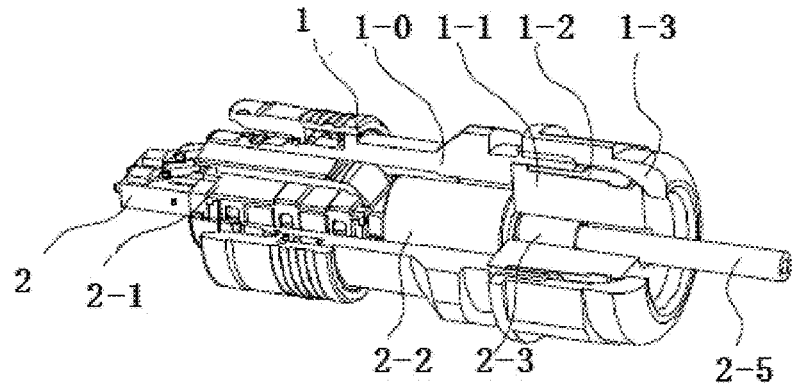
Figure 27:
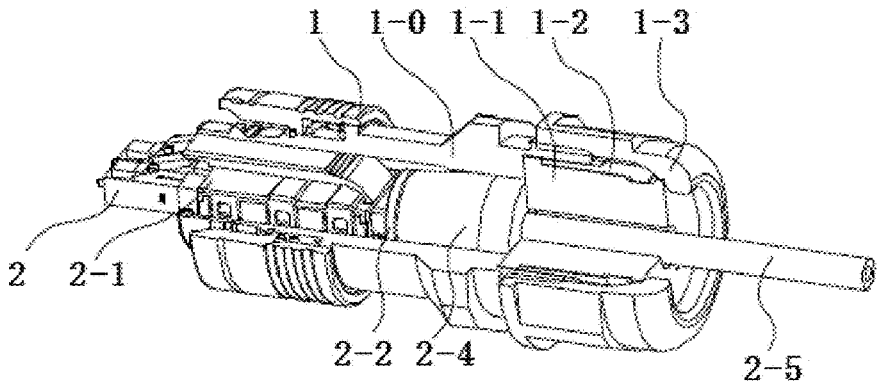
Figure 28:
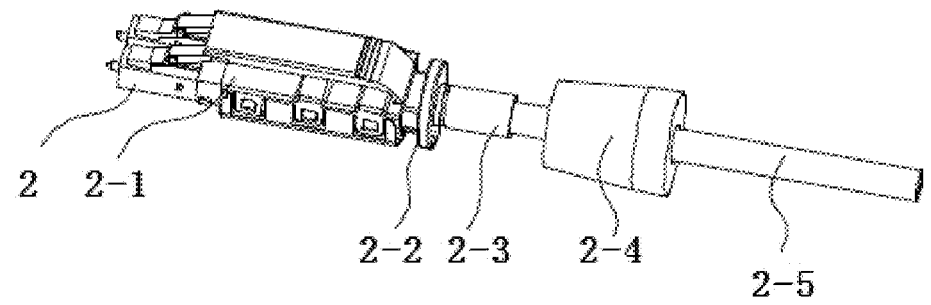
Figure 29:
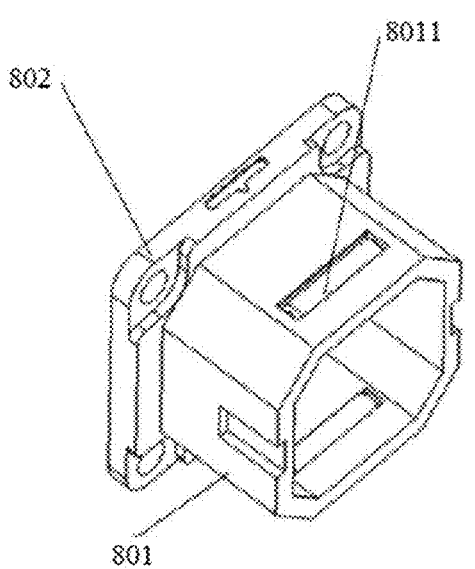
Figure 30:
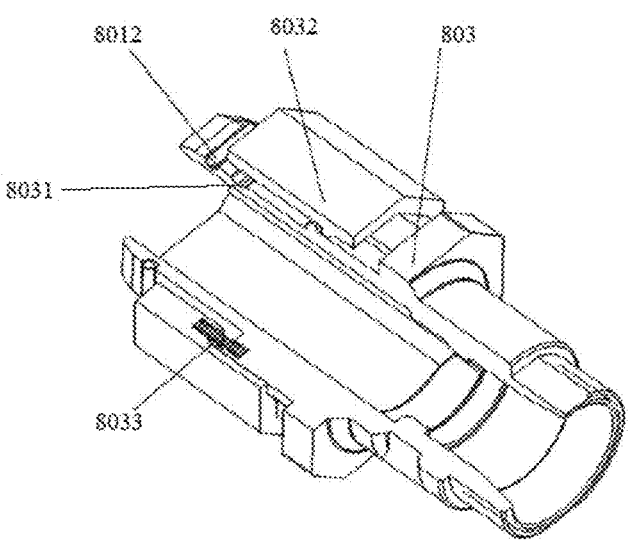
Figure 31:
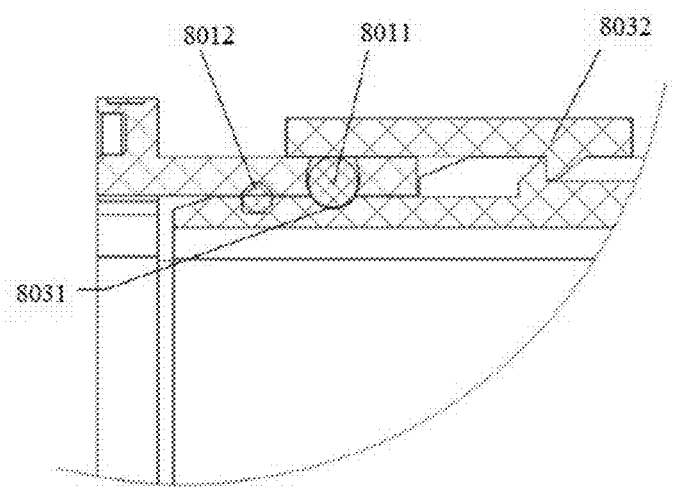
Figure 32:
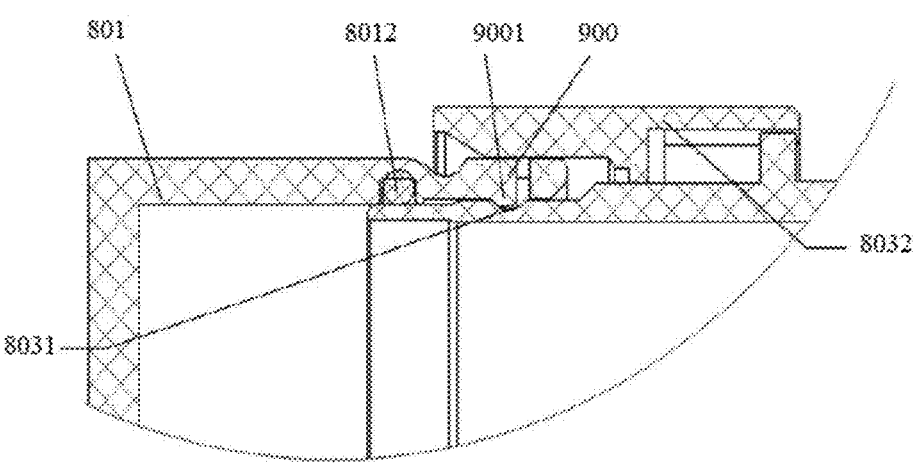
Figure 33:
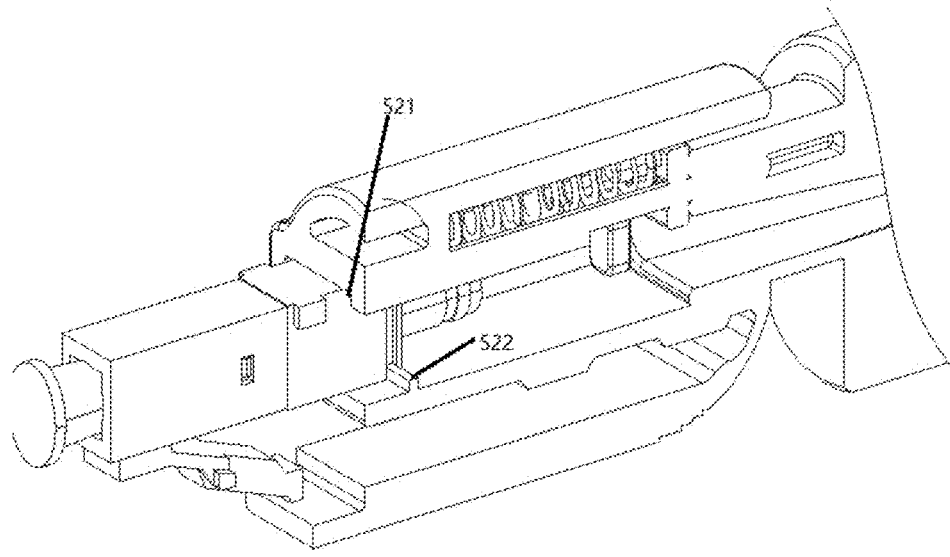

FIGS. 13a to 13d are another exemplary view of a ferrule moving in an X direction according to Embodiment III of a connector assembly of the present invention;

FIG. 14 is a schematic structural diagram of a support housing according to Embodiment III of a connector assembly of the present invention;

FIGS. 15 and 16 are schematic assembly diagrams of an inner core component and a housing component according to Embodiment III of a connector assembly of the present invention;

FIG. 17 is a schematic structural diagram of an inner core component according to Embodiment IV of a connector assembly of the present invention;

FIG. 18 is a schematic installation diagram of an inner core component and a housing component according to Embodiment IV of a connector assembly of the present invention;

FIG. 19 is a schematic fitting diagram of a cable and a tail end sealing structure according to Embodiment IV of a connector assembly of the present invention;

FIG. 20 is a schematic diagram of before and after states of a ferrule moving in an X direction according to Embodiment IV of a connector assembly of the present invention;

FIG. 21 is a schematic structural diagram of a connector according to Embodiment V of the present invention;

FIG. 22A is a schematic structural diagram of a deformable body of a connector according to Embodiment V of the present invention;

FIG. 22B is a schematic structural diagram of another deformable body of a connector according to Embodiment V of the present invention;

FIG. 23 is a schematic structural diagram of a connector according to Embodiment VI of the present invention;

FIG. 24A is a schematic structural diagram of a fixed hub according to Embodiment VI of the present invention;

FIG. 24B is a schematic structural diagram of another fixed hub according to Embodiment VI of the present invention;

FIG. 25 is a schematic structural diagram of a connector according to Embodiment VII of the present invention;

FIG. 26 is a schematic structural diagram of a connector having a fixed hub according to Embodiment VII of the present invention;

FIG. 27 is a schematic structural diagram of a connector having a connecting sleeve according to Embodiment VII of the present invention;

FIG. 28 is a schematic structural diagram of an inner core having a connecting sleeve according to Embodiment VII of the present invention;

FIG. 29 is a schematic structural diagram of a socket according to Embodiment VIII of the present invention;

FIG. 30 is a schematic structural diagram of a plug according to Embodiment VIII of the present invention;

FIG. 31 is a schematic diagram of a plug being inserted into a socket according to Embodiment VIII of the present invention;

FIG. 32 is a schematic diagram of a plug being inserted into a socket according to Embodiment IX of the present invention; and FIG. 33 is a schematic floating diagram of a plug according to an embodiment of the present invention.

DETAILED DESCRIPTION OF THE EMBODIMENTS

Further detailed description is made below with reference to the accompanying drawings and the better embodiments.

The present application provides a connector, as shown in FIGS. 1 to 28, the connector including a plug and a socket, where the plug is used to be connected to the socket in a fitting manner and includes a housing component 1 and an inner core component 2 which is provided in the housing component, where the housing component includes an inner housing and an outer housing which is movably sleeved at an outer side of the inner housing in an axial direction, the housing component is provided with a locking mechanism which is used to be connected to the socket to implement plug-socket locking, and the inner housing is provided with a plug anti-rotating structure which is adapted to a socket anti-rotating structure.

In the present application, the locking mechanism is used to ensure a fixed connection between the plug and the housing of the socket, and when the plug is connected to the housing of the socket, inner cores of the plug and the socket also implement contact and electrical connection with each other, and the inner core component of the plug is prevented from damaging due to deflection of the plug housing by means of anti-rotating structures on the plug and the socket housing.

The locking mechanism may be locking connection, threaded connection, and other connection manners, and the anti-rotating structure may be keyway fitting anti-rotating, or may implement anti-rotation by means of a circumferentially irregular plane. The following describes the locking mechanism and the anti-rotating structure in detail by means of Embodiment I and Embodiment II.

Embodiment I

Figure 1:
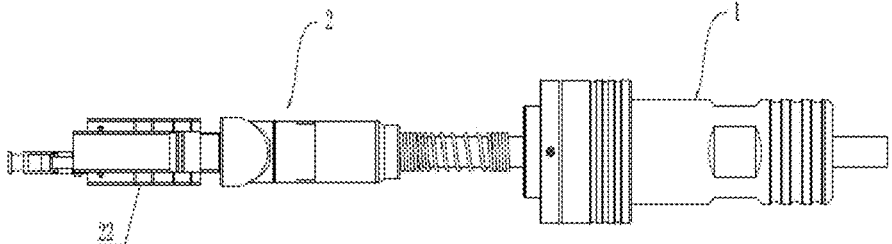
FIG. 1 is a structural exploded view of a plug according to Embodiment I of a connector assembly of the present invention.
Figure 2:
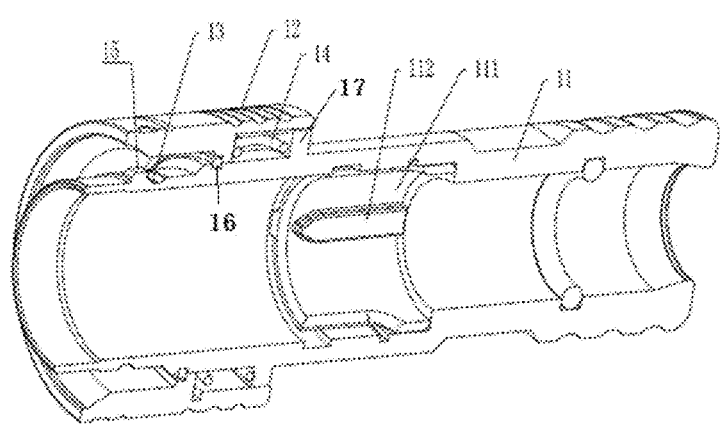
FIG. 2 is a schematic cross-sectional view of a plug housing component according to Embodiment I of a connector assembly of the present invention.
Figure 3:
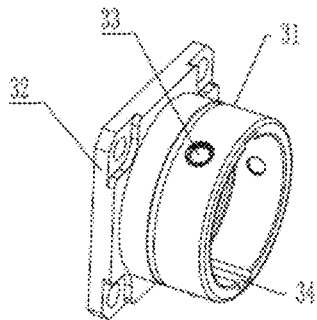
FIGS. 3 and 4 are schematic structural diagrams of a socket according to Embodiment I of a connector assembly of the present invention.
Figure 4:
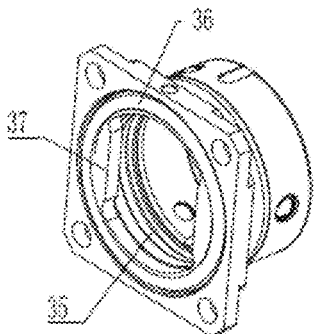
Figure 5:
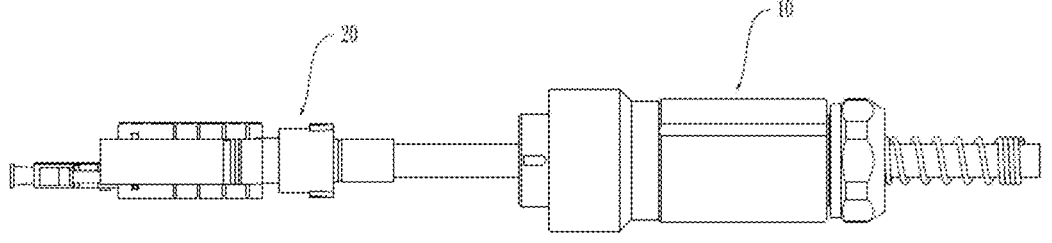
FIG. 5 is a schematic structural diagram of a plug according to Embodiment II of a connector assembly of the present invention.

This embodiment provides a push-pull connector assembly, which includes a connector plug and a connector socket adapted to connect the connector plug and is shown in FIGS. 1 and 2, where a plug-in end of the connector plug is defined as a front end, the connector plug includes a housing component 1 and an inner core component 2 which is provided in the housing component, where the housing component 1 includes an inner housing 11 and an outer housing 12, the outer housing is movably sleeved at an outer side of the inner housing in an axial direction, and the connector socket is assembled on a device panel by means of fitting of a screw hole in a fixed portion 32 at the back end of the socket and a fastener. As shown in FIGS. 3 and 4, the plug includes an adapted connector housing 31 on which at least one socket locking structure which is movably provided in a radial direction is assembled, and an adapted locking structure fitting the socket locking structure is provided on the inner housing, such that two ends of the plug and the socket construct the push-pull connector assembly.

In this embodiment, the socket locking structure is a round bead 33, and the adapted locking mechanism is a groove 13. During an insertion process of the plug and the socket, the inner housing 11 lifts the round bead; when the plug continues to be inserted into the socket, the round bead stops the outer housing and make it move towards a back end of the connector, and a reset elastic member 14 assembled between the outer housing 12 and the inner housing 11 is compressed; when the round bead falls into the groove, the reset elastic member provides an elastic force to reset the outer housing and limits the round bead in a radial direction, to implement plug-socket locking; and when the plug and the socket are unlocked, radial limitation to the round bead 33 is removed by pulling the outer housing 12 towards a tail end of the connector plug, and after the round bead is out of the groove, plug-socket unlocking may be implemented by continuously pulling the outer housing.

It should be noted that the socket locking structure may further be set as other floating units, for example, a locking column that can be in contact with the socket, or a locking sheet that is integrated with the connector housing.

In this embodiment, referring to FIG. 2, the reset elastic member 14 is provided between the outer housing 12 and a flange 17 of the inner housing 11, a retaining ring 16 which stops and fits the outer housing 12 in an axial direction is provided on an outer wall of the inner housing 11, and the retaining ring 16 is used to limit a resetting distance of the outer housing 12 and axially limit the outer housing 12 between the flange and the retaining ring. A front end of the inner housing 11 is provided as a flaring structure that guides the round bead and a lock ball, thereby facilitating plug-socket insertion.

In order to implement anti-rotation after the plug-socket insertion, plug-socket anti-rotating structures are provided at two ends of the plug and the socket, that is, an anti-rotating key 15 is provided on the inner housing, and a corresponding keyway 34 is provided in the adapted connector housing 31; and certainly, the anti-rotating key may also be provided at a socket end, and at this time, the keyway is at a plug end. At least one anti-rotating key or keyway is provided.

In this embodiment, a first sealing apparatus 35 that seals and fits an excircle surface of the inner housing is provided in the socket, and a second sealing apparatus 36 is provided at the back end of the fixed portion in an embedded manner, which is used to implement sealing between device panels; and the excircle surface of the inner housing constitutes a front end sealing structure with a size of an outer diameter thereof being between Φ18 mm and 21 mm; and a size from the center of the groove 13 to the front end of the inner housing is between 7 mm and 10 mm. Specifically referring to FIG. 4, a second sealing member is provided at the tail end of the socket housing, which is used to implement sealing between the socket and a panel or the socket and a case; a first sealing member is mounted on an inner wall of the socket housing, which seals and fits an outer wall of an plug-in body, and the first sealing member is further prevented from easily deforming due to a torque force under a condition of plug-socket anti-rotation; and the first sealing member and the second sealing member preferably are sealing rings to prevent water and dust.

Referring to FIG. 1, the inner core component of the present application includes a support sleeve for passing and assembling of a cable and a ferrule assembly which is assembled at a front end of the support sleeve and connected to a cable inner core, and the ferrule assembly 22 includes a support housing floatingly assembled at the front end of the support sleeve in an axial direction, thereby implementing axial floating of the whole connector. On the other hand, the present application designs anti-rotation between the ferrule assembly 22 and the inner core component 2: a positioning groove 211 which slidably fits a guide key in an axial direction to implement radial anti-rotation between the inner core component and the housing component is provided on the inner core component 2 to implement anti-rotation of the inner core component, and similarly, an inner core anti-rotating structure is provided on the support sleeve 201 to implement anti-rotation of the ferrule assembly 22.

It should be further noted that although the following embodiments do not give examples of a plurality of ferrule assemblies 22, those skilled in the art can perform structure changes according to the technical solutions of the present application, for example, the inner core component 2 is a multi-core structure.

Embodiment II

Figure 9:
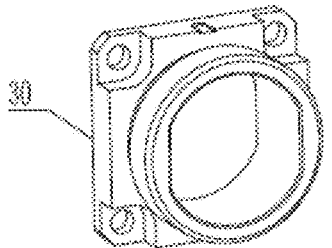
Figure 10:
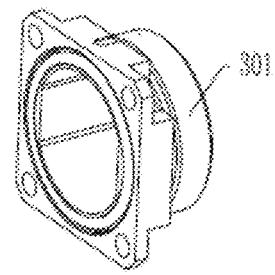
Figure 11:
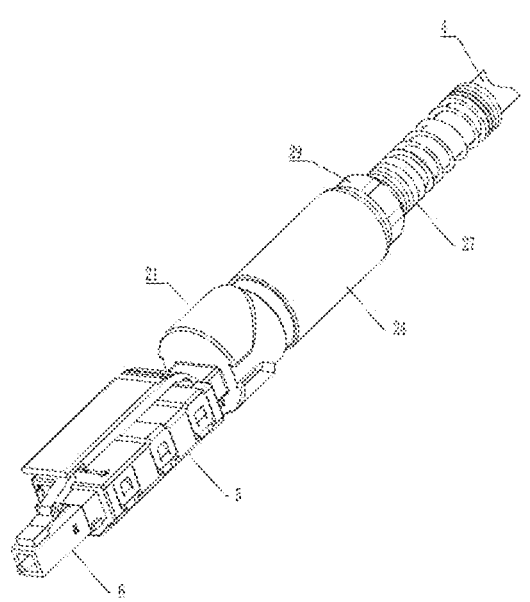
FIGS. 11 and 12 are schematic structural diagrams of an inner core component according to Embodiment III of a connector assembly of the present invention.

In this embodiment, there is provided a thread locking connector assembly, as shown in FIGS. 5 to 10, including a connector plug and a connector socket which insert and fit with each other, where a plug structure is shown in FIG. 11 and includes a housing component and an inner core component 20 which is provided in the housing component, and the housing component 10 includes an inner housing assembly and an outer housing assembly, where the inner housing assembly is sleeved in the outer housing assembly, a plug 30 is assembled on a device panel by means of a fixed portion at a back end of the plug 30, and the fixed portion is not limited to fixed flanges of a square shape, a circular shape, or other shapes, and an insertion and withdraw force may be averagely distributed by providing uniformly distributed screw holes to fit a fastener to perform fixing on the fixed portion. A plug-in end at a front end of the outer housing assembly is provided with a locking nut 101 which is used to fit an outer thread 301 of a socket housing at a socket end to implement plug-socket locking, such that two ends of the plug and the socket constitute a thread locking type connector assembly.

Figure 8:
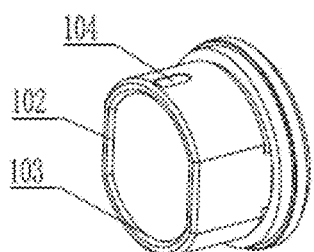
FIGS. 8 to 10 are schematic structural diagrams of a socket according to Embodiment II of a connector assembly of the present invention.

In combination with FIGS. 8 to 10, in this embodiment, a plug-socket anti-rotating structure is at least one pair of planar features 102 provided at the plug-in end at the front end of the inner housing assembly, and may further includes a pair of arc features 103, thereby forming a waisted interface. An indentation 104 may also be provided at a feature junction by connecting the planar feature and the arc feature, the plug-socket anti-rotating structure may fit a jack cavity with the same shape and structure as the socket end to implement plug-socket radial anti-rotation, and the indentation is used to fit structures such as a staple or a spring pin at the socket end to implement further locking. In another embodiment, the plug-socket anti-rotating structure may be a polygonal interface.

In this embodiment, the planar feature 102 specifically refers to that convex flats are symmetrically provided at the back end of the socket housing. The convex flat may be at a back end of a first sealing member in the Embodiment I, and a distance between the convex flats may be adaptively designed based on a type and a size of a conductive member module provided in a plug-in body. During a plug-socket insertion process, when the front end of the plug-in body abuts the convex flat, it is seen as insertion in place, which proves that the conductive member module and a corresponding module provided in the socket are inserted into each other in place and can conduct stably, and the convex flat plays a role in limiting and insertion position of the plug-in body, and in addition, a distance of a pair of convex flats should ensure that the inner core component can axially pass through. When two grooves distributed oppositely are provided at the front end of the socket housing, an angle between a symmetry plane of a pair of grooves and a symmetry plane of a pair of convex flats is 90°.

At least two screw holes may further be uniformly provided on an installation flange of the socket housing corresponding to Embodiment I or Embodiment II, for example, when the installation flange of the socket housing is square, two screw holes are provided on a clinodiagonal line or one screw hole is provided at each of four vertexes, which may uniformly distribute an insertion and withdraw force when the socket is under force; and in other embodiments, the installation flange of the socket housing may be of a circular shape or other shapes.

In this embodiment, an opening size of an inner hole for passing and assembling of the plug-in body on the socket housing is greater than or equal to 20 mm; a center-to-center distance of an installation hole is greater than or equal to 20 mm; a distance between convex flats is between 13.6 mm and 19.6 mm. However, the above sizes and distances of the embodiment are not limited, and size scaling may be performed according to demands of specific working conditions based on a structural form of the embodiment.

In some specific embodiments, the present application further provides a connector plug with an inner core component which includes a support sleeve for passing and assembling of a cable inner core and a ferrule assembly which is assembled at a front end of the support sleeve and is connected to the cable inner core, where the ferrule assembly includes a support housing movably assembled at the front end of the support sleeve in the axial direction, and a ferrule floatingly provided in a radial direction is movably assembled in the support housing. Detailed description is made below by means of Embodiment III and Embodiment IV. The inner core component of Embodiment III generally fits the plug housing of Embodiment I, and the inner core component of Embodiment IV generally fits the plug housing of Embodiment II. However, simple changes may be made to the above inner core component by those skilled in the art to enable each inner core component not to be limited in corresponding plug housing.

Embodiment III

Figure 12:
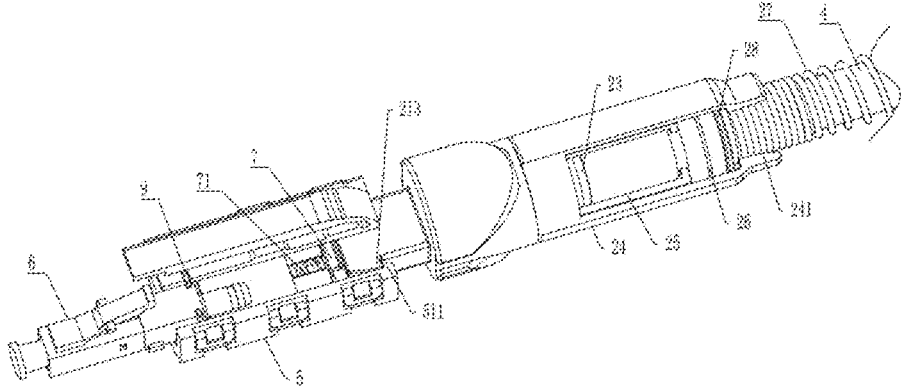
Figure 13:
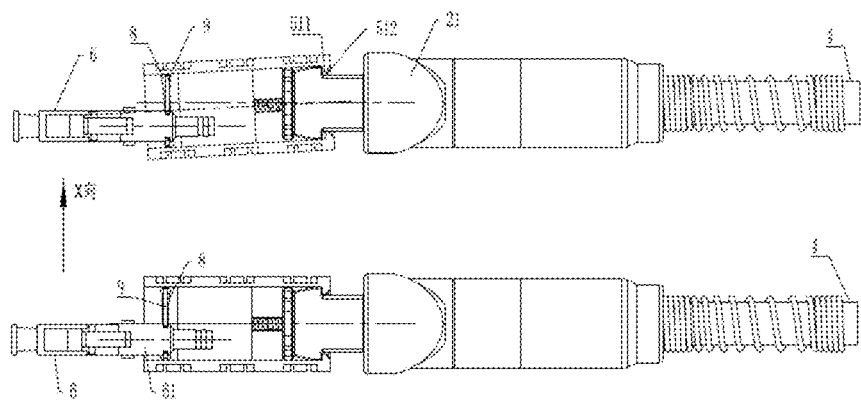
FIG. 13 is a schematic diagram of before and after states of a ferrule moving in an X direction according to Embodiment III of a connector assembly of the present invention.
Figure 13A:
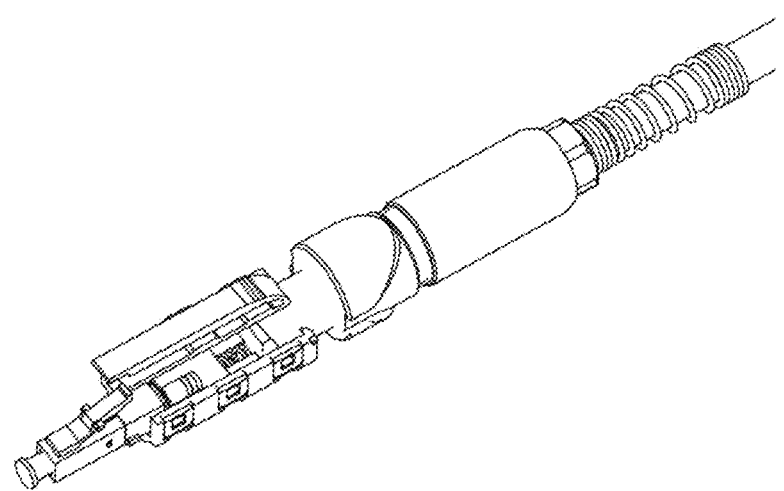
Figure 13B:
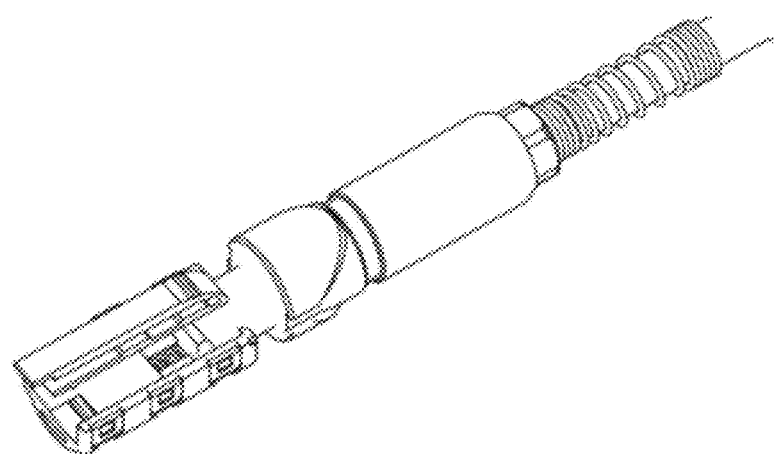
Figure 13C:
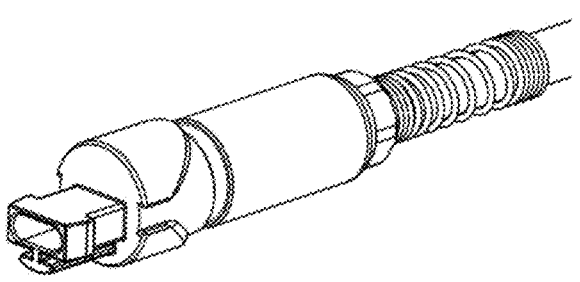
Figure 13D:
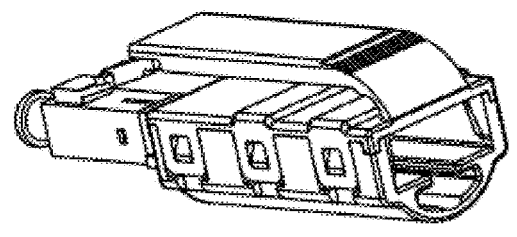

As shown in FIGS. 11 to 13, an inner core component 2 includes a support sleeve 21 and a ferrule assembly 22 which is floatingly assembled at a front end of the support sleeve in an axial direction. An inner core of a cable 4 passes through the support sleeve 21 to be connected to the ferrule assembly 22, and the support sleeve 21 supports and protects the inner core of the cable. The ferrule assembly is floatingly assembled at the front end of the support sleeve in the axial direction, which may be adapted to various different interface positions in the axial direction when single-core modules of different manufacturers are assembled in a socket end. The ferrule assembly 22 includes a support housing 5 movably provided at the front end of the support sleeve in the axial direction, and a ferrule 6 which may floats in a radial direction is assembled in the support sleeve; and the support housing includes a base 51 and a cover plate 52 that are fastened with each other, the support housing is of a hollow square housing type structure, the base is movably assembled at the front end of the support sleeve in the axial direction, a back end of the base is provided with a *varus* edge 511 fitting a stop portion 213 which is at an outer side of the front end of the support sleeve, a locking sheet 7 is fixed at the front end of the support sleeve, an elastic member 71 for maintaining a trend of the locking sheet separating from the base is provided between the locking sheet and the base, and the elastic member is preferably a spring which is sleeved on a guide pin fixed on the front end surface of the locking sheet. With the above structure, axial movement of the ferrule assembly may be implemented.

Figure 7:
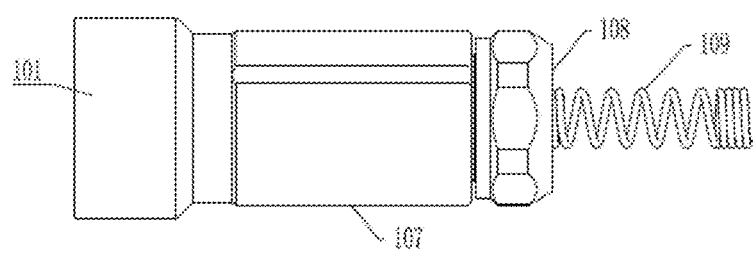
FIG. 7 is a schematic diagram of a plug outer housing assembly according to Embodiment II of a connector assembly of the present invention.

A movable groove 8 is provided in the support housing 5, and with reference to FIG. 14, movable grooves distributed oppositely are provided on the base and the cover plate. At least one ferrule is fixed on a spacer 9 shown in FIG. 13, a connecting manner of the spacer and a tail end 61 of the ferrule is locking connection fitting, so as to facilitate fast removal, and the spacer 9 is in the movable groove 8, and the height of the tail housing 61 of the ferrule is basically the same as the height of an opening at the front end of the support housing, thereby preventing the ferrule from shaking in a height direction. In this embodiment, a length of the spacer is equivalent to a groove length of the movable groove, and a groove width of the movable groove gradually increases from the middle to two ends, and the two ends of the movable groove has a space for the spacer to relatively deflect in a certain angle, to enable the spacer to deflect in a certain range in the movable groove. As shown in FIG. 7, when the ferrule 6 in a plug is inserted into the single-core module in a socket, if the ferrule and the single-core module exists position deviation in an X direction, the ferrule needs to move in the X direction for insertion and fitting with the single-core module, but the ferrule must always maintain an axial horizontal position, and cannot deflect/tilt when inserting. Therefore, the movable groove will perform relative deflection with respect to the spacer, which may implement that radial translation in the X direction in the figure is performed with the ferrule keeping axial distribution, and therefore, the support housing will perform adaptive deflection to implement this function. Preferably, the *varus* edge 511 at the back end of the support housing 5 has a gap 512 in a radial direction with the front end of the support sleeve, which is beneficial to the support housing to deflect.

In an optional implementation, in addition to the radial movement between the ferrule 6 and the support housing 5 through the spacer 9, a sliding key may further be provided on the ferrule 6, and a chute in a radial direction is correspondingly provided on the support housing 5, or the chute is provided on the ferrule, and a corresponding sliding key is provided on the support housing, as shown in FIG. 33, thereby implementing left or right deflection of the ferrule 6.

FIGS. 13a to 13d and FIG. 33 are schematic movement diagrams in a plurality of directions between the ferrule 6 and the support housing 5. As shown in FIG. 33, a chute 511 in an axial direction is provided at an upper side of the support housing, and the chute 511 fits a slider of the ferrule 6, to implement axial movement of the ferrule 6. A strip block 522 perpendicular to a direction of the chute 521 is provide at the bottom of the support housing, the ferrule 6 is correspondingly provided with the chute, and fitting of the strip block and the chute enables the ferrule 6 to deflect left and right along a length direction of the strip block and float along a radial direction of the connector.

In another embodiment, in order to improve a distance of the ferrule moving in the X direction for adapting more different fixed positions of the single-core modules in the socket end in the X direction, the spacer may be designed to be significantly shorter than a length of the movable groove, and at this time, the spacer not only can deflect with respect to the movable groove, but also can be slided in a length direction of the groove in the movable groove. Combining deflection and sliding to implement a relatively long translation distance of the ferrule in the X direction.

The plug connector in the embodiment not only implements movement of the ferrule in the axial direction, but also implements whole floating of the ferrule in the radial direction, and combination of the two may adapt the socket to assemble various single-core modules of different axial and radial positions, which greatly improves versatility of the connector.

As shown in FIGS. 15 and 16, the inner core component 2 is provided in the inner housing 11, a neck bush 111 is fixed in the inner housing, at least one guide key 112 extending in the axial direction is provided on the neck bush, and a positioning groove 211 which is slided and fits with the guide key to implement radial anti-rotation between the inner core component and the housing component is provided on the inner core component 2. In this embodiment, the positioning groove forms an inner core anti-rotating structure, and the guide key forms an adaptive anti-rotating structure, which is not limited thereto. The guide key may also be provided on the inner core component, and the positioning groove is provided in the connector housing at this time.

In this embodiment, the positioning groove 211 is provided on the support sleeve 21, and the back end of the positioning groove is provided as a flaring structure, which forms a guide surface, so as to insert and guide the guide key to implement fast assembling of the inner core component. After the inner core component 2 is assembled in place, a positioning surface 212 provided at the back end of the support sleeve 21 stops and fits a step 113 in the inner housing 11, thereby axially limiting the back end of the inner core component.

Back to FIG. 12, in a specific embodiment, the inner core component further includes a crimping sleeve 23, a sealing sleeve 24, a protective sleeve 25, and a sealing member 26. The support sleeve 21 crimps a cable 4 by means of the crimping sleeve 23, and the support sleeve may stretch into the cable to support the cable and ensure a certain axial tensile force, or the support sleeve does not stretch into cable, and the back end surface of the support sleeve is on an even height with the end surface of the cable, and connection between the support sleeve and the cable may also be implemented by crimping the crimping sleeve. The sealing sleeve 24 is in threaded connection with the back end of the support sleeve 21 to be sleeved at an outer side of the crimping sleeve, to cover and protect a tail end of the inner core component, and the protective sleeve 25 is provided between the crimping sleeve 23 and the sealing sleeve 24; the sealing member 26 is sleeved on the cable and is located between the cable and the sealing sleeve, and the sealing member 26 is pressed tightly by axially moving the sealing sleeve, to implement sealing between the inner core component and the cable; and the sealing member may also implement the sealing between the inner core component and the cable without the axial tight pressing, the sealing member preferably being a sealing ring.

In FIG. 12, a sealing apparatus is provided between the ferrule 6 and the support housing 5, a sealing apparatus is provided between the support housing 5 and the support sleeve 21, and sealing between the cable and the sealing sleeve is performed by means of the sealing member 26, thereby implementing a whole sealing effect of the cable on a transmission channel.

Preferably, the inner core component further includes a protective spring 27 which supports and protects the cable 4 and enables the cable to have better anti-bending performance. A folding portion formed by folding a front end of the protective spring 27 outwards is pressed tightly and limited between the step at the tail end of the sealing ring and a gasket 28, the gasket is sleeved on the cable and is at the back end of the sealing member, the tail end of the sealing ring radially shrinks to form a locking fitting portion which is convenient for fitting a tail cover 29, an inner wall of the locking fitting portion is provided with an arc surface 241, the arc surface gradually inclines and extends outwards from the front end to the back end to facilitate bending of the cable and provide protection, and the tail cover 29 is in threaded connection with the tail end of the sealing sleeve 24 to perform tail end locking of the inner core component and provide a certain performing clamping force for the protective spring, which improves stability of the protective spring. In order to implement the sealing between the inner core component 2 and the housing assembly, a sealing unit 114 which seals and fits an excircle surface of the sealing sleeve 24 is provided on the inner wall of the inner housing in an embedded manner, the sealing unit preferably being the sealing ring.

In the above embodiment, a function of the protective spring 27 is similar to that of a protective spring 109 in FIG. 7, and the protective spring 27 and the protective spring 109 all support and protect the cable.

In this embodiment, at least one retaining block 37 is provided at the back end of an inner hole of the socket and fits the front end of the inner housing to implement limitation of an insertion position of the plug, and the retaining block avoids the ferrule assembly at the front end of the inner core component in the radial direction of the socket, thereby implementing fitting with the inner core component.

In other embodiments, a reset elastic member and an elastic retaining ring structure which limits a resetting distance of the outer housing also may not be provided, and the outer housing is driven to reciprocate in a proper axial sliding process by means of an external linkage mechanical structure of the connector.

Example IV

An inner core component provided by the embodiment is shown in FIGS. 17 to 20. The inner core component 20 includes a support sleeve 201, a ferrule assembly 202 floatingly assembled at a front end of the support sleeve in an axial direction, where an inner core anti-rotating structure is provided on the support sleeve 201, and a back end of the support sleeve crimps a cable 4 by means of a crimping sleeve 203. A difference between the ferrule assembly 202 in the embodiment and the ferrule assembly in Embodiment 1 of a connector assembly is that: a movable groove on a support housing may also be slided and fit with a spacer in a groove length direction, and groove widths in a groove length extension direction are the same. At this time, the spacer 90 can also implement movement of the ferrule in an X direction without relative deflection to the movable groove 80. With reference to FIG. 20, a length of the spacer 90 is obviously less than an opening length of the movable groove 80 in a radial direction of a connector, the spacer is guided and slided in the movable groove to drive the ferrule to perform translation in the X direction, and the support housing 50 does not need to deflect and incline. It is worth noting that the ferrule assembly in the embodiment may also use the ferrule assembly in Embodiment III.

Figure 6:
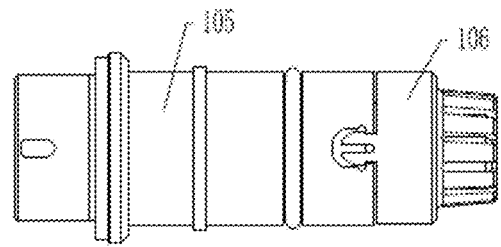
FIG. 6 is a schematic diagram of a plug inner housing assembly according to Embodiment II of a connector assembly of the present invention.

As shown in FIG. 6, an inner housing assembly includes a front end inner housing 105 and a tail end sealing structure 106 that are connected with each other, and a connection manner of the two is clip-on connection that may be installed fast, which is used to implement plug-socket anti-rotating sealing and tail end protective function. In other embodiments, the front end inner housing may also use bonding, gluing, threaded connection, forced assembling and fitting, and other manners to be connected to the tail end sealing structure.

Referring to FIGS. 18 to 20, an excircle surface of the front end inner housing implement a sealing function between the inner housing assembly and the outer housing assembly by providing a sealing ring element 1051; and at least one guide groove 1052 is provided in the front end inner housing, and the inner core anti-rotating structure is a bulge 204 which radially stops and fits the guide groove, thereby implementing radial anti-rotation after the inner core component is assembled in the inner housing assembly. In other embodiments, the bulge may also be in the inner housing assembly, and the guide groove is on the support sleeve.

In combination with FIG. 7, the outer housing assembly includes an outer housing 107, a tail end nut 108 in threaded connection with the tail end of the outer housing, and a protective spring 109. An inner wall of the outer housing assembly is provided with an inverted structure in a circumferential direction, and an outer wall of the inner housing component is provided with an adapted inverted structure which stops and fits the inverted structure in an axial direction. The inverted structure is an elastic locking sheet 1071, the adapted inverted structure is a flange 1053, and the flange implements backstop in an inner core component insertion direction after crossing the elastic locking sheet. A backstop surface 1072 is provided in the tail end of the outer housing, and stops and fits the tail end sealing structure 106 in the axial direction to implement tail end backstop, to prevent the inner housing assembly from de-intercalating from the tail end of the outer housing assembly.

The tail end sealing structure 106 includes a connecting cap 1061 connected to the front end inner housing, a back end of the connecting cap is a cavity composed of a plurality of elastic claws 1062 distributed circumferentially, an elastic rubber ring 1063 for a cable to pass through is provided in the cavity, and the elastic rubber ring is pressed between the connecting cap and the front end inner housing. During a locking process of the plug and the socket, the inner core component moves axially towards a back end direction with the inner housing assembly under the pushing action of a socket end, a tail end conical surface 1073 in the outer housing assembly extrudes the elastic claws 1062, and the elastic claws shrink radially and extrude the elastic rubber ring 1063 to enable an inner cavity of the elastic rubber ring to shrink and extrude the cable to implement sealing protection between the connector and the cable. A cable sealing area A is shown in FIG. 19.

A tensile resistance surface 1054 is provided in the front end inner housing of the inner housing assembly, and axially stops and fits the back end of the support sleeve to implement tensile protection of the ferrule component. The protective spring 109 is sleeved at an outer side of the cable, thereby improving an anti-bending performance of the cable, and the protective spring may be in fixed connection with a tail end nut 108.

As an expansion of the embodiment, the groove width of the movable groove is equal to or slightly less than a thickness of the spacer, and in this way, the spacer may be inserted into the movable groove in a micro forced assembling manner, thereby having a certain damping during a sliding process. When a position of the single-core module in the socket and the ferrule in the plug exist deviation in the radial direction, the ferrule may have a certain stability after the spacer is adjusted to an alignment position, which avoids a need for recalibrating a position due to the easily loose spacer, and generally, an interface or an insertion hole of the single-core module has a guide surface for easy insertion, which is more convenient for fitting and inserting.

In this embodiment, when the plug is inserted into the socket and after the ferrule is pre-inserted into the single-core module in the socket, the outer housing is rotated to enable a front end nut thereof to fit an outer thread of the socket to implement locking. During this process, the inner housing assembly does not rotate, the outer housing assembly drives the inner housing assembly to axially move to a front end direction during a rotating and fitting process, the inner core component moves to the back end under an axial pushing action of the single-core module with respect to the outer housing assembly, which enables the inner cavity of the elastic rubber ring in the tail end sealing structure to shrink and extrude an outer ring of the cable to implement sealing and protection.

In Embodiment III and Embodiment IV of a connector assembly, the ferrule can adopt a commonly used plug-in port such as a LC, or a DLC, or a RJ45, thereby transmitting an optical signal, or an electrical signal, or a photo-electric signal; and the movable groove may also be of a groove-shaped structure which is used for inserting, assembling, and sliding of the spacer or swinging of the socket and is formed by a bulge structure which is distributed in pairs, extended and provided in the radial direction, and provided on a base and/or a cover plate.

In other embodiments of the connector assembly, locking and fitting of the connector and the adapted connector may also use connector locking structures such as handle locking, clip-on locking, curved groove locking, or spring pin locking.

In the above Embodiment IV, the tail end conical surface 1073 in the outer housing assembly extrudes movable ends of the elastic claws 1062, and the elastic claws shrink radially and extrude the elastic rubber ring 1063 to enable the inner cavity of the elastic rubber ring to shrink and extrude the cable to implement the sealing protection between the connector and the cable. It can be understood that the tail end conical surface 1073 which provides radial pressure may further be implemented by the inner housing, or may be provided by a tail cover (e.g., a tail cover 29 provided by FIG. 11) connected to the inner housing assembly and the outer housing assembly. For convenience of description, a new embodiment is added herein. Extrusion pressure is applied by means of a nut connected to the inner housing assembly, thereby implementing demands of sealing and tensile resistance of the connector, and details are shown in Embodiment V and Embodiment VI.

Embodiment V

Referring to FIGS. 21 to 24, an inner housing of a connector plug includes a deformable body 1001, a jaw 1002, and a nut 1003; and an inner core component is used for signal transmission and includes a tail end cable 2003 and a cable restraint 2002 fixed on the cable 2003.

The connecting cap 1003 is connected and fixed at a tail of the housing in an anti-stretching manner, and a back end of an inner cavity of the connecting cap gradually shrinks from front to back. In the embodiments of the present invention, the connecting cap implements anti-stretching fixation with the housing by means of fitting of an inner thread at the front end of the connecting cap and an outer thread at the tail of the housing, which is not limited thereto.

A front end of the deformable body 1001 is assembled in the housing and axially stops and limits a step surface in the housing, and a back end of the deformable body 1001 stretches out the tail end of the housing and enters the inner cavity of the connecting cap 1003, and is limited by a tail end shrinkage end surface of the connecting cap 1003. A through hole for the cable restraint 2002 to pass through is provided in an axial direction in the deformable body, and the cable 2003 passes through the though hole in the deformable body and stretches out from the connecting cap at the tail end of the protection unit; and the cable restraint 2002 is at least partially provided in the though hole in the deformable body 1001, and axially limits the deformable body 1001. In the embodiment of the present invention, an inner wall of the deformable body 1001 has a joint surface that fits the cable restraint 2002 under external pressure to implement axial limitation of the two, and preferably, a back end of the joint surface is a step surface that stops and limits a back end surface of the cable restraint, that is, a section of the joint surface is roughly L-shaped. In the embodiment of the present invention, the step surface is a front end surface bulged in the back end of the deformable body 1001, and the step surface is a bevel or an arc surface, which is not limited thereto.

The inner wall of the deformable body 1001 may be a smooth surface, or may be provided with concave-convex lines for reinforcing friction of the inner wall.

In the embodiment of the present invention, a shrinkage surface of the connecting cap 1003 being in contact with the deformable body 1001 is a bevel or an arc surface.

The jaw 1002 is closely sleeved on a periphery of the deformable body 1001, and axially limits the deformable body 1001. A front end of the jaw is between the deformable body and the housing, and a back end convex portion of the jaw 1002 has a peripheral surface adapted to the inner shrinkage surface of the connecting cap 1003. When the connecting cap 1003 moves forward, the inner shrinkage surface thereof extrudes the back end convex portion of the jaw. Due to existence of the shrinkage surface, forces on the back end convex portion may be divided into an axial force and a radial force, and due to existence of an axial limitation structure, the jaw does not have axial motion, but the deformable body 1001 is extruded inwards under the action of the radial force to deform inwards to hold the cable restraint 2002 and the cable 2003 tightly, and at this time, the joint surface in the deformable body 1001 fits the cable restraint 2002 on the cable 2003 under the action of pressure, which implements tensile resistance.

In the embodiment of the present invention, the jaw 1002 is further provided with an engaging hook which fits a groove on a periphery of the deformable body 1001 to implement radial limitation of the two, and a peripheral surface at a front end of the engaging hook has a slope surface which is adapted to the shrinkage surface of the inner cavity of the connecting cap and is used to transmit the axial force and the radial force.

In the embodiment of the present invention, the jaw 1002 implements axial limitation with an end surface at the tail end of the housing by means of a bulge on the periphery of the front end of the jaw.

In some optional embodiments, the jaw 1002 may also not be provided, and a slope surface which is adapted to the shrinkage surface of the connecting cap 1003 and is used to convert the axial motion of the connecting cap 1003 into an axial and a radial compressive force is provided on the periphery of the back end of the deformable body 1001.

Embodiment VI

Please refer to FIGS. 23 and 24, it is a deformation of Embodiment V of the present invention. In this embodiment, a fixed hub 300 is fixed at the tail end of the cable restraint 2002, and the fixed hub 300 closely fits the tail end of the cable restraint 2002 and has concave and convex lines externally to reinforce friction on the surface of the fixed hub. The joint surface on the inner wall of the deformable body fits on the periphery of the fixed hub 300 under the pressure of the connecting cap 1003, to implement tensile resistance, and the back end of the joint surface of the deformable body is a step surface which stops and limits a back end surface of the fixed hub, to improve a tensile resistance effect. In the embodiment of the present application, the step surface which stops and limits the back end surface of the fixed hub is a front end surface of a convex ring shape at the back end of the deformable body, and an inner diameter of a convex ring at the back end is slightly greater than an outer diameter of the cable 2003. The fixed hub 300 is a closed cyclic structure or a cyclic structure with one side open.

In another embodiment of the present invention, the fixed hub 300 is integrated at the tail end of the cable restraint, that is, the tail end of the cable restraint is provided with concave and convex lines.

The deformable body 1001 has a slit in the radial direction, so as to pull apart the deformable body to stick the deformable body in the cable 2003 or the cable restraint 2002.

In yet another embodiment of the present application, the jaw and the deformable body are of an integrated structure, that is, a peripheral surface at the back end of the deformable body is provided with a slope surface which is adapted to a shrinkage surface of the connecting cap and can transmit a radial force brought by axial motion of the connecting cap inwards to implement radial compression, which enables a joint surface in the deformable body to closely fit the fixed hub or the cable restraint to implement tensile resistance of the connector.

The connector provided in the embodiment implements radial extrusion of the deformable body by axial movement of a connecting cap, thereby implementing reliable sealing and holding of the deformable body to the cable at the tail end of an inner signal transmission unit, and when the cable is stretched by an external force, the external force is moved to an outer protective housing due to the holding of the deformable body, thereby implementing sealing and tensile resistance demands of the connector.

In an optional embodiment, as shown in FIG. 25, a connector inner core component 2 includes a plug-in portion 2-1 at the front end, a support sleeve 2-2 at the back end, and a cable 2-5, where the support sleeve 2-2 is connected to the cable 2-5 by means of a fixed hub 2-3 fixed at the tail end of the support sleeve 2-2, and the support sleeve 2-2 can implement the reliable sealing and the tensile resistance effect of the cable similarly as the cable restraint.

In some optional embodiments, the present application further provides deformation embodiments of Embodiment III and Embodiment IV, that is, provides a connector having axial floating, and a plug part of the connector includes the housing and the inner core component provided in the housing, and details can be seen in Embodiment VII.

Embodiment VII

In this embodiment, the inner core component includes a front end plug-in portion and a back end cable, and the front end plug-in portion has axial floating with a support sleeve which is fixedly provided on the cable; a tail of the housing component has a nut for the cable to pass through a cavity and has a rubber ring which is used to implement cable sealing, and limits a back end of the support sleeve, and a front end of the rubber ring axially limits a housing; and a back end of the rubber ring is limited by the cavity at the back end of the housing, and an inner wall of the cavity of the housing extrudes the rubber ring forward and inwards when the housing moves forward to enable the rubber ring to hold the cable tightly to implement sealing and tensile resistance.

Referring to FIG. 25, the inner core component 2 of the connector includes the plug-in portion 2-1 at the front end, the support sleeve 2-2 at the back end, and the cable 2-5, where the support sleeve 2-2 is in fixed connection with the cable 2-5, and the plug-in portion 2-1 may float front and back with respect to the support sleeve 2-2. In this embodiment, a spring for implementing axial floating of the two is provided between the plug-in portion 2-1 and the support sleeve 2-2.

The housing component 1 includes a housing 1-0, a rubber ring 1-1, and a nut 1-3. The nut 1-3 is fixedly assembled at the tail of the housing 1-0, and has a cavity for the cable to pass through, and the slight right of the back end of the cavity of the nut gradually shrinks backwards. The rubber ring 1-1 is sleeved out of the cable, the front end stops and limits a step surface in the housing, the back end stretches out the housing 1-0 and is limited by the nut 1-3, and when the nut 1-3 moves forward, forward extrusion pressure and inward extrusion pressure can be provided for the rubber ring 1-1, which enables the rubber ring to hold the cable 2-5 tightly to implement reliable sealing and tensile resistance.

A front end surface of the rubber ring further stops and limits the back end of the support sleeve 2-2, that is, when the plug-in portion floats backwards, the spring promotes the support sleeve backwards and presses the support sleeve on the front end surface of the rubber ring tightly.

In this embodiment, a jaw which fits the inner wall of the cavity of the nut 1-3 to extrude the rubber inwards when the nut 1-3 move forward is provided between the rubber ring 1-1 and the nut 1-3, and the jaw 1-2 axially limits the rubber ring 1-1. Specifically, a bulge structure is provided on the periphery of the back end of the jaw 1-2, a peripheral surface of the bulge structure is a slope surface adapted to a shrinkage surface on the inner wall of the cavity of the nut, which enables the shrinkage surface in the cavity to extrude the slope surface on the jaw 1-2 when the nut moves forward. Because the extrusion pressure may be divided into an axial force and a radial force, and the jaw axially limits the rubber ring, therefore, the jaw can extrude the rubber ring inwards to make the rubber ring closely fit the periphery of the cable, to implement sealing and tensile resistance. In this embodiment, a back end surface of the rubber ring is axially limited by the shrinkage surface of nut.

In an alternative embodiment, the jaw is not provided, and a slope surface which is adapted to the shrinkage surface of the nut and is used to convert the axial motion of the nut into an axial and a radial compressive force is provided on the periphery of the back end of the rubber ring.

FIG. 26 gives a structure deformation of the embodiment. In the embodiment, the support sleeve 2-2 is connected to the cable 2-5 by means of a fixed hub 2-3 fixed at the tail of the support sleeve 2-2, the rubber ring 1-1 is sleeved on the fixed hub 2-3 and the cable 2-5 at this time, and a front end surface of the rubber ring still stops and limits a tail surface of the support sleeve.

FIGS. 27 and 28 are another structure deformation of the embodiment. The support sleeve 2-2 is connected to the cable 2-5 by means of the fixed hub 2-3 fixed at the tail end of the support sleeve 2-2, a connecting sleeve 2-4 is provided between the support 2-2 and the rubber ring 1-1, and providing of the connecting sleeve 2-4 may satisfy adjustment to a distance between the back end surface of the support sleeve and the rubber ring 1-1. By adding the support sleeve and satisfying axial limitation of the rubber ring to the support sleeve when there is the distance between the support sleeve and the rubber ring, the present application implements adaptation to different sizes of connector inner core assemblies. A tensile resistance technical effect of the cable is implemented similarly by means of the connecting sleeve 2-4.

In still another embodiment of the present application, the support sleeve 2-2 is connected to the cable by means of the connecting sleeve or the connecting sleeve is sleeved on the cable at the back end of the support sleeve which is connected to the cable, and the back end surface of the connecting sleeve 2-4 stops and limits the rubber ring.

In the present application, the support sleeve or the connecting sleeve which are in contact with the end surface of the rubber ring are conical structures with small front and big end, to increase a contact area with the rubber ring.

Embodiment VIII

Similar to Embodiment I, a difference is that in addition to being set as a locking bead, a floating unit of the present application may further be set as a locking column that can be in contact with the socket.

In practice, locking is performed in a locking bead manner. A locking structure of the locking bead can implement fast locking, but because contact of a locking position is point contact, strength of a locking mechanism is relatively low, and in order to improve the strength, a material of a locking fitting portion of the locking bead requires a high-strength material. Therefore, metal is generally selected in the prior art, and increases a wall thickness of the material of a locking position at the same time, but whether the high-strength material is selected or the wall thickness is increased, product cost will be greatly increased, and increase of the wall thickness will also cause a product size to become larger, which results in larger installation size of a connector, larger reserved position on a device, and increase of product weight; on the other hand, processing of a locking bead hole is relatively complicated, and the locking bead hole can only be processed by machining, and can not be processed by mold processes, so the cost is high. Therefore, a push-pull locking structure in a form of locking bead limits a development trend of miniaturization and low cost of products to a certain extent.

Therefore, in the present application, the locking bead is replaced by a locking column, and as shown in FIG. 29, a socket includes a socket housing 801 and may be assembled on a corresponding device by means of a fixed portion 802 at the back end. As shown in FIG. 30, a plug includes a plug housing 803 fitting the socket, a locking column 8011 is movably provided on the socket housing 801 in a radial direction, and the locking column 8011 falls in a locking groove 8031 which is on a peripheral surface of the plug housing 803 of the plug after the plug is inserted into the socket in place, and axially stops and fits the locking groove 8031, thereby implementing axial locking after the plug is inserted into the socket. At this time, the floating unit is in axial surface contact with the locking groove. In order to keep an axial locking state, the outer side of the plug housing 803 is movably provided with a locking sleeve 8032 in an axial direction, the locking sleeve 8032 radially limits the locking column 8011 to de-intercalate from the locking groove 8031 after the locking column 8011 falls into the locking groove 8031. Further, a reset elastic member is assembled between the locking sleeve and the plug housing, for example, a reset spring 8033.

As shown in FIG. 31, when inserting, the plug housing 803 is pushed to make the insertion end at the front end of the plug housing be inserted into the socket housing 801, and the locking column 8011 is lifted by the plug housing 803 and protrudes out of the outer wall of the socket housing 801. As the plug housing 803 component continues to advance, the locking column 8011 drives the locking sleeve 8032 to draw back in the axial direction, and the reset spring 8033 is compressed. When the floating unit is in the position of the locking groove and falls in the locking groove 8031, the locking column 8011 does not stop the locking sleeve 8032 in the axial direction, and the locking sleeve 8032 is reset in the axial direction under the action of the reset spring 8033 and presses the locking column 8011 tightly to implement locking. Because the locking column is in surface contact with an adapted locking groove in the axial direction, a locking mechanism performance of the connector assembly is significantly improved.

In order to ensure tightness of the connector assembly, there is further provided a sealing unit 8012, for example, a sealing ring. The sealing unit may be provided on the inner wall of the socket, thereby fitting a peripheral sealing surface of the plug housing to implement a sealing effect, or the sealing unit is provided on the outer wall of the plug housing, thereby sealing and fitting the inner wall of the socket. By means of the sealing unit, sealing may be implemented at the same time as the connector assembly is inserted and locked, thereby adapting to a waterproof environment.

Embodiment IX

Similar to Embodiment VIII, a difference is that a floating unit of the present application may further be set as a locking sheet that is integrated with a connector housing.

Still referring to the component numbers of Embodiment VIII, and in combination with FIG. 30 and FIG. 32, it is noted that: a locking sheet 900 is an elastic cantilever structure, and a front end of the locking sheet 900 is a movable end and has a locking bulge 9001 adapted to a locking groove 8031; during an insertion process of a plug and a socket, a plug housing 803 lifts the locking sheet 900, a front end of the locking sheet 900 is tilted and push a locking sleeve 8032 to move backwards, and a reset spring 8033 is compressed. Then after the locking bulge 9001 of the locking sleeve 900 falls in the locking groove 8031, the locking sleeve 8032 is reset under the action of the reset spring 8033 and presses the locking sheet 900 tightly to prevent the movable end of the locking sheet from being lifted, and the plug and the socket implement sealing by means of a sealing unit 8012. Because the locking sheet is in surface contact with the locking groove, a manner of low-cost process mold forming can be used to process while improving a mechanical performance of the connector, which improves production efficiency.

It is worth noting that, although the locking column and locking sheet of Embodiment VIII and Embodiment IX can implement a surface contact axial locking function with the locking groove, advantages of the locking column over the locking sheet are: (1) During a connector locking process, because the locking column and the connector housing are separately provided, a locking column structure can float freely; and the movable end of the locking column has a downward reset elastic force, and axially rubs with an adapted connector housing at the beginning of the insertion of the plug and the socket, and therefore, the locking column may effectively improve a hand feeling of locking, and has an insertion force smaller than the locking sheet during the insertion process; (2) Due to a problem of processes, the locking column structure can be adapted to metal and plastic structure, but a locking sheet structure can only be brought out by using a mold manner, and the material is generally plastic; (3) The locking sheet needs a relatively long cantilever beam and a housing with a relatively larger size, and when the locking sheet has the same locking mechanical performance as the locking column structure, the overall size of the locking sheet is relatively larger; (4) The locking sheet and the connector housing are formed by an integrated mold, and the strength of plastics is lower than that of metal materials or other ceramic materials to a certain extent. For the locking column structure, the locking column is an independent part, and the material of the locking column may be changed to metal or other materials with higher strength, and therefore, the locking column structure can better improve the mechanical performance of the product.

In addition, a locking manner of a locking bead type may further implement a purpose of increasing the mechanical performance by means of a manner of abreast locking beads, but a locking structure of the abreast locking beads is in point contact with the locking of a single locking bead, and therefore, it may occurs that the abreast beads are not all in a locking state when locking, and some locking beads are in a virtual connection state, resulting in a risk of reducing mechanical strength of the connector. In order to ensure strength, the locking structure of the abreast locking beads needs to control distances between locking beads, which will result in an oversize connector. On the other hand, processing of a locking bead hole for separating the locking structure of the locking bead is relatively complex, and the locking bead hole can only be processed by machining, and can not be processed by mold processes, so the cost is high. The locking structure of the locking column or locking sheet provided by the present invention is easy to stably maintain a large contact area, is easy to process, and has high locking strength, which can better implement functions of low cost and high strength.

The above description is merely the better embodiments of the present invention, and for any technical personnel familiar with the discipline, any simple modifications, equivalent changes and modifications made to the above embodiments according to the technical substance of the present invention all fall within the technical solutions of the present invention without departing from a range of technical solutions of the present invention.

What is claimed is:

1. A connector plug, which is used to be connected to a connector socket in a fitting manner, the plug comprising a housing component and an inner core component which is provided in the housing component, the housing component comprises an inner housing and an outer housing which is axially sleeved at an outer side of the inner housing, the housing component is provided with a locking mechanism which is used to be connected to the socket to implement plug-socket locking, and the inner housing is provided with a plug anti-rotating structure which is adapted to a socket anti-rotating structure, the housing component is a push-pull housing component, and an inner housing of the push-pull housing component is provided with a groove which locks and fits a floating unit on the socket that is adapted to connect to the groove to implement the plug-socket locking; or the housing component is a thread housing component which comprises an inner housing assembly and an outer housing assembly, wherein the inner housing assembly is provided in the outer housing assembly, the inner core component is mounted in the inner housing assembly, and the outer housing assembly of the thread housing component has an inner thread which is used to be connected to a housing thread of an adapted connector to implement the plug-socket locking, a back end of the inner housing is provided with a sealing unit which is used to implement a sealing function between the inner core component and the inner housing, wherein a backstop surface which stops and fits a tail end sealing structure in the axial direction is provided inside of a tail end of the outer housing assembly, to prevent the inner housing assembly from de-intercalating from the tail end of the outer housing assembly.

2. The plug according to claim 1, wherein the floating unit is a locking bead, or a locking column which can be in contact with the socket surface, or a locking sheet which is integrated with a connector housing.

3. The plug according to claim 1, wherein an inner wall of the outer housing assembly is provided with an inverted structure in a circumferential direction, and an outer wall of the inner housing component is provided with an adapted inverted structure which stops and fits the inverted structure in an axial direction.

4. The plug according to claim 1, wherein the inner core component comprises a support sleeve for passing and assembling of a cable inner core and a ferrule assembly which is assembled at a front end of the support sleeve and is connected to the cable inner core, the ferrule assembly comprising a support housing movably assembled at the front end of the support sleeve in the axial direction.

5. The plug according to claim 4, wherein a movable groove is provided on the support housing in a radial direction, at least one ferrule is fixed on a spacer, and the spacer is movably provided in the movable groove to implement radial floating assembling of the ferrule.

6. The plug according to claim 5, wherein a groove width of the movable groove gradually increases from the middle to two ends to enable the spacer to deflect in the movable groove.

7. The plug according to claim 4, wherein the support housing comprises a base and a cover plate that are connected to each other, and the base is movably assembled at the front end of the support sleeve in an axial direction, and a back end of the base is provided with a *varus* edge fitting a stop portion which is at an outer side of the front end of the support sleeve.

8. The plug according to claim 4, wherein at least one inner core anti-rotating structure is provided at the outer side of the support sleeve, thereby implementing radial rotation stopping after the inner core component is assembled.

9. The plug according to claim 1, wherein the inner core component comprises a tail cable and a cable restraint, and the housing component comprises a housing and a connecting cap which is fixed at a tail of the housing in an anti-stretching manner; and a front end is assembled in the housing and a back end of a deformable body which is axially limited by the housing are limited by an inner cavity surface at the back end of the connecting cap, and when the connecting cap moves forward, an axial and radial compressive force can be provided for the deformable body, such that the deformable body shrinks inwards until a joint surface on an inner wall thereof is closely fit with a cable restraint to implement tensile resistance.

10. The plug according to claim 9, wherein a back end of a jaw which is assembled between the deformable body and the connecting cap and has axial limitation with the deformable body is limited by the inner cavity surface at the tail of the connecting cap, and the back end of the jaw can cooperate with a surface which gradually converges from front to back in the inner cavity of the connecting cap to compress the deformable body forward and inwards when the connecting cap moves forward.

11. The plug according to claim 9, wherein the inner wall of the deformable body therein is a smooth surface or is provided with a surface having concave-convex lines for reinforcing friction, a tail of the cable restraint is fixed or integrated with a fixed hub having concave-convex lines on a periphery, and the joint surface on the inner wall of the deformable body is fit with the fixed hub under the action of extrusion pressure.

12. The plug according to claim 9, wherein the deformable body therein has a slit which is convenient for pulling apart the deformable body to assemble in a radial direction.

13. The plug according to claim 1, wherein the inner core component comprises a front end plug-in portion and a back end cable, and the front end plug-in portion has axial floating with a support sleeve which is fixedly provided on the cable; a tail of the housing component has a nut for the cable to pass through a cavity and has a rubber ring which is used to implement cable sealing, and limits a back end of the support sleeve, and a front end of the rubber ring axially limits a housing; and a back end of the rubber ring is limited by the cavity at the back end of the housing, and an inner wall of the cavity of the housing extrudes the rubber ring forward and inwards when the housing moves forward to enable the rubber ring to hold the cable tightly to implement sealing and tensile resistance.

* * * * *